United States Patent [19]
Reynaud

[11] 3,832,779
[45] Sept. 3, 1974

[54] DEVICE FOR MILLING AND TAKING IMPRESSION FOR THE PLACING OF PEG TEETH

[76] Inventor: Marc Reynaud, 16 Blvd. Gambetta, 38000 Grenoble, France

[22] Filed: Feb. 9, 1973

[21] Appl. No.: 331,266

[52] U.S. Cl. .................................................. 32/48
[51] Int. Cl. ............................................. A61c 3/02
[58] Field of Search ............. 32/13, 48, 49; 29/103; 408/208, 209, 219, 220, 223, 224, 225

[56] References Cited
UNITED STATES PATENTS

| | | | |
|---|---|---|---|
| 418,108 | 12/1889 | Browne | 32/48 |
| 533,738 | 2/1895 | Philbrook | 32/49 |
| 749,624 | 1/1904 | McGullough | 32/48 |
| 788,906 | 5/1905 | Homann | 32/48 |

Primary Examiner—Antonio F. Guida
Assistant Examiner—J. Q. Lever
Attorney, Agent, or Firm—Robert E. Burns; Emmanuel J. Lobato; Bruce L. Adams

[57] ABSTRACT

A milling tool for preparing teeth for the placement of artificial peg teeth comprises a shaft provided with a milling cutter comprising a leading end portion of the shaft conically tapered toward a leading end of the milling tool and having a truncated conical surface on which three cutting blades are circumferentially disposed equally spaced. A portion of the truncated conical surface near the leading end of the milling tool functions as a pilot and guides displacement of the milling tool to position it during milling operations.

4 Claims, 5 Drawing Figures

PATENTED SEP 3 1974      3,832,779

DEVICE FOR MILLING AND TAKING IMPRESSION FOR THE PLACING OF PEG TEETH

SUMMARY OF THE INVENTION

This invention relates to the dental technique of realising and placing artificial teeth comprising a pin or peg intended to penetrate into a root canal.

The realization of a peg tooth of the Richemond type is well known in the art of dentistry. This technique makes use, at the outset, of the drilling of a root canal. A milling tool is already known comprising a miller having a lateral cutting surface of frustroconical shape which is continued axially by a root pilot comprising a non-cutting body of revolution, the diameter of which decreases towards the leading end of said pilot.

A known milling device of this type possesses a certain number of disadvantages. In the first place, the cutting miller proper has an external diameter much greater than that of the sleeve of the tool to which it is connected by a narrowed neck which constitutes a weak point and leads to risk of breakage. In addition, the milling cutter may function with difficulty under satisfactory operating conditions, because it comprises a large number of blades and frequently becomes blocked. Finally, a lateral surface discontinuity exists between the milling cutter and the root pilot which has a much smaller diameter than the milling cutter, and of which only the extremity is conical.

BACKGROUND OF THE INVENTION

The present invention has as an objective the overcoming of these disadvantages by achieving a milling tool which is reliable in operation, is very firm and solid, and which does not become blocked during operation. This objective is achieved as a result of the fact that the milling cutter comprises only three cutting blades evenly distributed around a longitudinal axis, these blades being therefore separated from one another by fairly large relieved spaces, and also as a result of the fact that the root pilot possesses in totality a conical surface which is an extension of a lateral frustroconical surface of the milling cutter.

BRIEF DESCRIPTION OF THE DRAWINGS

There will be described below, by way of a non-restrictive example, a form of embodiment of the present invention with reference to the attached drawing, in which.

DESCRIPTION OF THE PREFERRED EMBODIMENT

Figure 2:
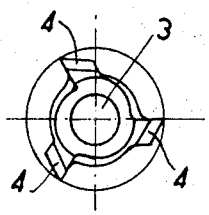
FIG. 2 is a view of the milling device from below.
Figure 1:
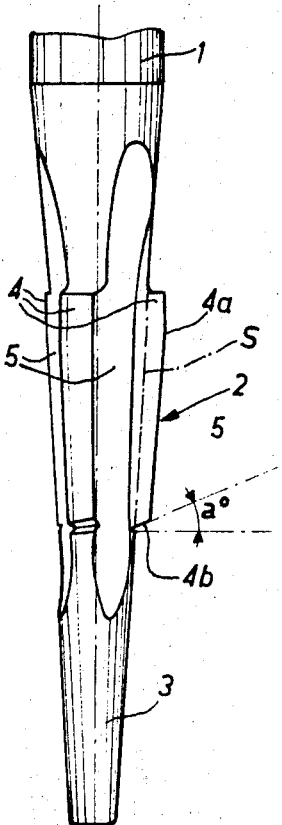
FIG. 1 is a partial elevation view of a milling device according to the invention.

The milling device shown in FIGS. 1 and 2 comprises a cylindrical sleeve 1 intended to be rotationally driven and only a portion of which is shown, this sleeve being extended by a milling cutter 2 having a frustroconical or truncated conical cutting lateral surface terminating in its turn at a guiding root pilot 3.

As can be seen from the drawing, the milling cutter 2 and the guiding pilot 3 form in practice only one single piece having a frustroconical lateral surface S. The milling cutter 2 comprises three cutting blades 4 evenly distributed around the longitudinal axis of the device, that is to say that they are disposed at 120° from one another. The blades 4 of the milling cutter are in fact cut from the same mass as the guiding pilot 3, their cutting edges 4a slightly projecting relative to the conical surface S upon which the milling cutter 2 and the pilot 3 are inscribed.

Between the blades 4 are formed, in the body of the miller, hollows 5, recessed relative to the frustroconical surface S and permitting an appreciable removal of the dust progressively as milling proceeds. In this way blockage of the cutter is prevented.

The root guiding pilot 3 is frustroconical in totality and joins to the milling cutter 2 without discontinuity. Due to this fact, risk of fracture in the junction zone between the pilot 3 and the milling cutter 2 is avoided.

The conicity of the milling cutter 2 and the length of the guide 3 are determined so as to correct, during the progress of milling, the errors of laterality which exist at the start.

As can be seen in FIG. 1, the cutting blades 4 possess a lower leading edge 4b forming an angle $a$ of approximately 20° with respect to a transverse plane normal to the longitudinal axis of the milling tool. This makes it possible to obtain, in the finished hole, a shoulder of the same angle, as can be seen in the following figures.

Figure 3:
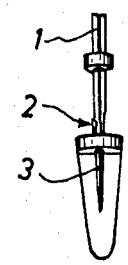
FIGS. 3 and 4 are views illustrating the penetration of the milling device into a root canal.
Figure 4:
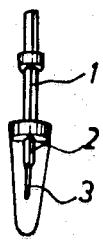

FIGS. 3 and 4 illustrate respectively the penetration of the milling device in a root canal of a tooth, at the commencement of penetration, and at the end of milling respectively.

Figure 5:
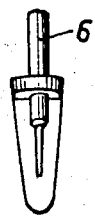
FIG. 5 is a view of a peg of plastic material disposed in a drilled hole formed in a root canal.

FIG. 5 illustrates the insertion, into the finished hole, of a peg 6 of prefabricated plastics material. This peg 6, formed of unbreakable material, serves solely for taking an impression. This impression peg is of a specific color and is opaque. It is subsequently replaced in the laboratory by a similar combustible peg, of the same color but translucid. The range of different colors makes possible cross-referencing of the cores, since the milling cutters associated with the various pegs carry rings of the same color.

I claim:

1. A milling tool for preparing teeth for the placement of artificial peg teeth comprising, a shaft provided with a milling cutter at a leading end partial portion said leading end portion of said shaft and said milling cutter thereon being conically tapered toward a leading end of said milling tool and having a truncated conical surface, said milling cutter comprising three cutting blades disposed on said truncated conical surface evenly spaced circumferentially about a longitudinal axis of said milling tool, said truncated conical surface being provided with longitudinal recesses between said cutting blades, and said milling tool leading end portion comprising pilot means comprising a portion of said truncated conical surface ajdacent said milling tool leading end for guiding in operation a direction of travel of said milling tool.

2. A milling tool for preparing teeth for the placement of artificial peg teeth according to claim 1 wherein each of said cutting blades comprises a narrow land disposed extending in a longitudinal direction of said milling tool on said truncated conical surface and terminating at a distance from said leading end of said milling tool, said lands each having a cutting edge along said longitudinal direction.

3. A milling tool for preparing teeth for the placement of artificial peg teeth according to claim 2 wherein each of said lands is provided with another cutting edge at an end of said land nearest said leading end of said milling tool.

4. A milling tool for preparing teeth for the placement of artificial peg teeth according to claim 3 wherein each of said other cutting edges is inclined by an angle of approximately 20° to a plane normal to said longitudinal axis of said milling tool.

* * * * *